April 25, 1961
L. PÉRAS
2,981,281
PRESSURE-REDUCERS
Filed Aug. 4, 1958
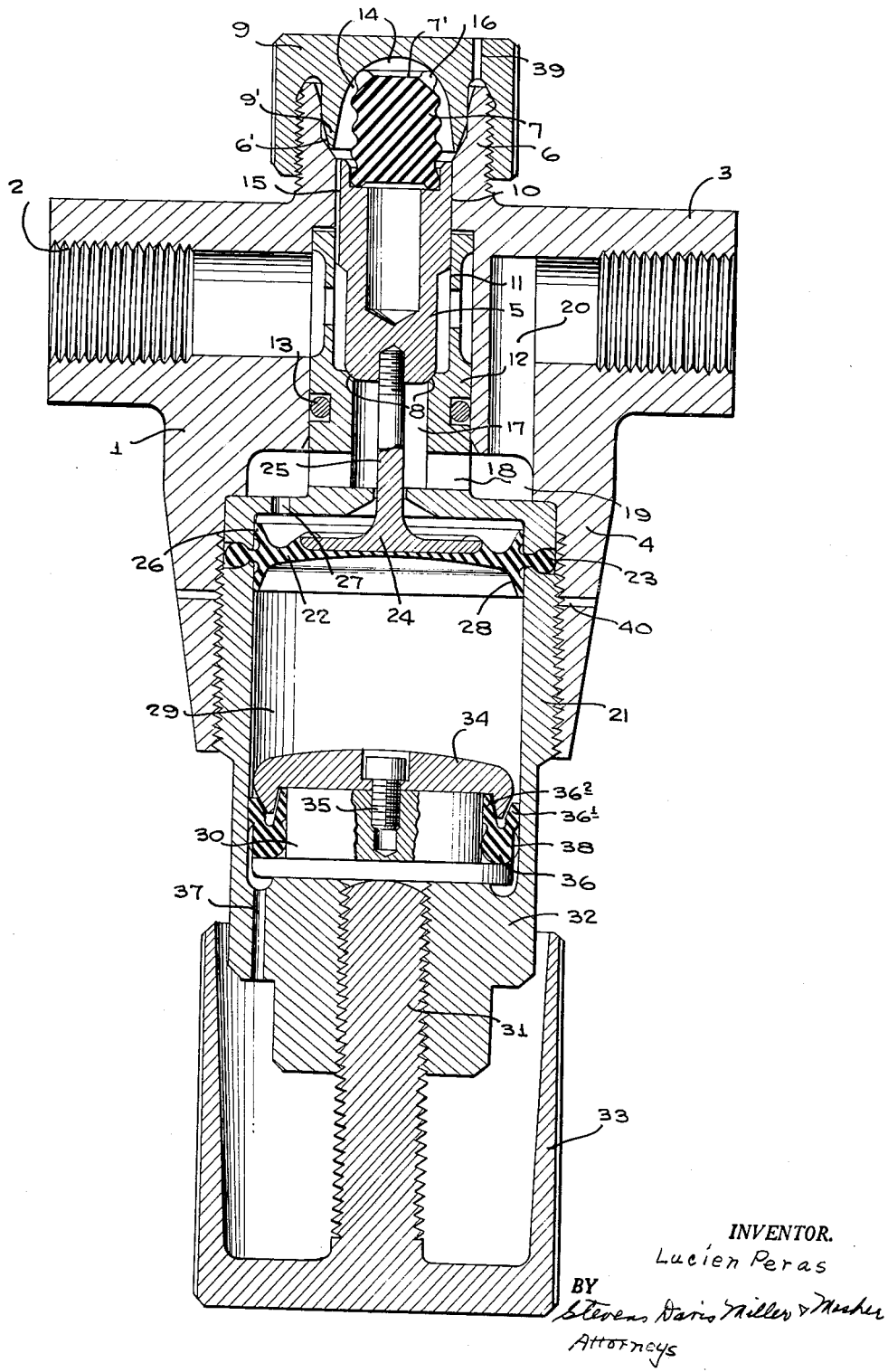
INVENTOR.
Lucien Peras
BY Stevens Davis Miller & Mosher
Attorneys

United States Patent Office

2,981,281
PRESSURE-REDUCERS
Lucien Péras, Billancourt, France, assignor to Regie Nationale des Usines Renault, Billancourt, France Filed Aug. 4, 1958, Ser. No. 752,913
Claims priority, application France Aug. 19, 1957
1 Claim. (Cl. 137—505.37)

The present invention relates to improvements in or relating to devices for reducing the pressure of gaseous fluids, these improvements consisting essentially in substituting pneumatic means for the metal springs usually provided for exerting a predetermined adjustment pressure on the valve controlling the flow of fluid through the device, the aforesaid adjustment pressure being obtained, according to this invention, by compressing a certain volume of air.

To this end, the pneumatic means according to this invention comprises essentially a cylinder in which a piston adjustable in the axial direction is slidably mounted and adapted to exert the desired adjustment pressure tending to open the valve of the pressure-reducer, through the medium of an air cushion and on another member of the piston- or flexible diaphragm type which is rigidly connected to said valve and subjected, on its face opposite to said air cushion, to the fluid under "reduced" pressure conditions.

According to a specific form of embodiment of this invention leading to the complete elimination of any spring means from the pressure reducer, the aforesaid valve is normally kept in its seated position by a deformable elastic biasing member.

As the pressure reducer is designed for delivering expanded fluid at a pressure lying within a predetermined and relatively wide range of pressures, it will be readily understood that the adjustment pressure of the valve may be obtained by so dimensioning the aforesaid pneumatic means as to ensure a proper safety of operation of the device.

The advantageous properties of a pressure-reducer according to this invention are also derived from the use of elastic packings of the type formed with flexible lips ensuring a highly reliable fluid-tightness in the chamber constituting the air cushion in the pneumatic device.

On the whole, the fact that all springs are definitely eliminated constitutes an important safety factor in the operation of the device. It is known that the springs of conventional pressure-reducing apparatus are particularly liable to corrosion so that after a relatively short time of operation they become altered and their initial elasticity is impaired; as a consequence, sudden failures are most likely to occur and add themselves to the unreliability and maintainance requirements of these devices.

The improvements constituting the subject-matter of the present invention will appear more clearly from the following description of a typical form of embodiment of a pressure-reducing device constructed according to the teachings of this invention and illustrated diagrammatically in axial section by way of example in the single figure of the attached drawing forming part of this specification.

In the drawing, the body 1 of the device is formed with a plurality of pipe-connections having the following purposes: the reference numeral 2 denotes the pipe for connecting the pressure-reducer to the source of fluid under pressure; 3 is the outlet pipe having connected thereto the apparatus utilizing the fluid under "expanded" pressure conditions; 4 is the pipe for connecting the pneumatic device controlling the valve 5 of the pressure-reducer; 6 is the pipe for introducing this valve 5 which also contains a deformable elastic biasing member 7 of rubber or other suitable plastic material which is interposed between the valve 5—to seat same—and a compression plug 9 for sealing this pipe. The valve 5 is adapted to slide in the bore 10 of body 1 and also in the bore 11 of a gridiron member 12 inserted in position through the pipe 4 and constituting a valve seat 8, a toroidal gasket 13 being provided in a groove of the gridiron member 12 to seal it relative to the body 1. In fact, it will be seen that under normal conditions the region overlying the seat 8 and surrounding the valve 5 is subjected to the pressure of the fluid supplied by the source connected to pipe 2, this pressure being furthermore admitted above the valve in the chamber 14 formed under the plug 9 through a passage 15 formed along the valve and notches 16 formed in the upper projecting bead $7^1$ of the deformable elastic biasing member 7, whereby the pressure of the fluid to be expanded will assist in seating the valve. The plug 9 provides a fluid-tight connection between the pipe 6 and this plug 9 due to the engagement of the circular lip $9^1$ of the plug with the cup-shaped seat $6^1$ formed in the pipe 6, as shown, this engagement taking place with a certain elastic pressure resulting from the fact that the plug is screwed home on the relevant pipe, the pressure in chamber 14 assisting in providing the aforesaid sealing contact between the circular lip $9^1$ and the cup-shaped seat $6^1$.

An axial passage 17 is formed in the gridiron member 12 under the valve seat and communicates permanently with the outlet pipe 3 of the pressure-reducer through the radial passage 18 of said gridiron member, the annular space 19 provided between the lower portion thereof and the body 1, and also through the passage 20 formed in this body.

The pneumatic device controlling the valve 5 comprises a cylinder 21 screwed in the pipe 4 and adapted when mounted on the one hand to lock the bottom portion of the gridiron member 12 in position in the body 1 and on the other hand to secure a deformable elastic diaphragm 22 by clamping its toroidal outer peripheral bead 23 between registering shoulders of the two members 12 and 21. This elastic diaphragm 22 consisting of rubber or like adequate material is used for controlling the opening of the valve and to this end, embedded in its central portion, by vulcanization, is a disc 24 formed with an axial screw-threaded shank 25 on which the valve 5 is screwed, as shown.

Thus, the diaphragm constitutes the upper end wall of cylinder 21 and comprises on its outer periphery a pair of opposite flexible sealing lips 26, 28 adapted the former 26 to seal the inside of the lower portion of the gridiron member, that is, the face thereof which is subjected through the passage 27 to the pressure of the expanded fluid when the device is operating, and the other 28 to seal the upper end of the chamber 29 formed in the cylinder and wherein the air cushion is built for adjusting the pressure-reducing device.

This air cushion is obtained by displacing a piston 30 operable from the outside by means of a screw 31 extending through the bottom of the cylinder 32 and carrying a suitable knurled handle 33.

This piston 30 is provided with a dome-shaped top member 34 secured by a screw 35 and adapted to secure a packing 36 formed with two divergent sealing lips and providing a reliable uni-directional fluid-tightness at the cylinder end opposite to that provided with the diaphragm 22, the outer lip 36¹ engaging the cylinder wall and the inner lip 36² the piston wall, as shown.

This pressure-reducing device operates as follows:

Assuming the control handle 33 to be unscrewed completely as shown in the figure, the piston 30 bears on the bottom 32 of the cylinder. The chamber 29 is filled with air at the atmospheric pressure due to the provision of a passage 37 connecting the inner space of the cylinder with the surrounding atmosphere; on the other hand, if the pressure in this space were below the atmospheric value, air at the atmospheric pressure would be admitted therein through notches 38 formed in the bead of packing 36 of which the outer lip 36¹ may yield slightly and act as a valve, as shown.

If at this time the pipe 2 of the pressure-reducer is connected to the outlet of a supply of compressed air, for example, the pressure above the seat 8 will rise but no fluid flow will occur as the valve is seated as already explained. The pressure-reducer acts then like a closed cock.

If the control handle 33 is rotated to cause the piston 30 to rise in the body 1, an air cushion of gradually increasing pressure builds up in the chamber 29. At a certain moment this pressure will become capable of pushing the diaphragm 22 to unseat the valve 5. The air from the supply will then flow through the outlet pipe 3 through the path already explained hereinabove.

Under these conditions, the valve is responsive to two opposite assemblies of forces. The first assembly results from the action of the air supply pressure acting thereupon, from the elastic force of deformable elastic biasing member 7, and finally from the "expanded" pressure acting on the upper face of diaphragm 22. The other assembly results from the action of the "expanded" pressure exerted on the underside of the valve and from the force transmitted to the diaphragm 22 by the air cushion built up in chamber 29.

It will be readily understood that whatever pressure may be created in this chamber 29 between predetermined limits, there is an equilibrium of forces permitting such a flow of air through the valve that the pressure after this valve remains stable at a value lying between zero and the supply pressure, whereby the apparatus will maintain in the pipe 2 and towards the load apparatus connected thereto a predetermined "expanded" pressure.

If the air cushion in chamber 29 is compressed to a higher degree, the force tending to unseat the valve will be further increased and the "expanded" pressure will be increased accordingly. If on the contrary this air cushion is compressed to a lower degree, the "expanded" pressure decreases.

It will be noted that the plug 9 has a safety and check hole 39 formed therethrough. In fact, if the plug were unscrewed while the pressure-reducer is connected to the supply network the air will escape therethrough after a few turns, thus warning the operator.

A hole 40 is also formed through the lateral wall of pipe 4 to act, as in the case of hole 39, as a safety device in case the cylinder 21 were unscrewed before cutting off the air supply connected to pipe 2. The escape of air through this hole 40 would warn the operator before the cylinder is unscrewed completely.

Of course, this form of embodiment should not be construed as limiting the field of the invention as many modifications and alterations may be brought thereto without departing from the spirit and scope of the invention as set forth in the appended claim; thus, the deformable diaphragm may be replaced by a piston provided with a rod connected to the valve and with suitable packing means.

I claim:

In a fluid flow control device, a body having opposing inlet and outlet passages, said body having a bore perpendicularly formed between the passages, said bore having inner and outer ends, a member disposed in the inner end of the bore and defining a valve seat, a movable valve member cooperating with the seat and interposed between the passages, a cap member closing off the outer end of the bore, a deformable elastic biasing member interposed between the valve and the cap member to urge the valve member into engagement with the valve seat, said valve member being exteriorly formed with a passage communicating the inlet passage with a space between the check member and the cap member whereby the pressure of the fluid of the inlet passage will act on the check member to assist in seating the valve, passage means communicating the valve seat behind the valve member with the outlet passage, a cylinder having opposing inner and outer ends and secured at its inner end to the body and disposed in axial alignment with the valve member, a deformable elastic diaphragm, means sealingly securing the diaphragm between the valve seat forming member and the inner end of the cylinder with the diaphragm defining an inner transverse end wall for cylinder, a rigid stem member axially extending between and connecting the diaphragm and the valve member, a piston workably disposed in the cylinder, packing means interposed between the piston and the wall of the cylinder, said packing means being formed to provide a uni-directional fluid tightness at the cylinder end opposite to the inner end of the cylinder provided with the diaphragm, air passage means through the outer end of the cylinder in communication with the atmosphere, a control handle carried by the outer end of the cylinder and having an operating portion disposed through the outer end and in engagement with the piston for moving the piston toward the diaphragm, said piston and the diaphragm defining an air chamber in the cylinder, said packing having peripheral notches formed therein for allowing atmospheric air to enter said air chamber through the passage in the end wall of the cylinder whereby said chamber encloses an air cushion and the piston when moved toward the diaphragm gradually increases the pressure of the air cushion to unseat the valve.

References Cited in the file of this patent

UNITED STATES PATENTS

| | | |
|---|---|---|
| 1,524,052 | Pagel | Jan. 27, 1925 |
| 1,793,292 | Taylor | Feb. 17, 1931 |
| 2,103,822 | Perry | Dec. 28, 1937 |
| 2,487,650 | Grove | Nov. 8, 1949 |
| 2,587,728 | Hoskins | Mar. 4, 1952 |
| 2,868,223 | Lum | Jan. 13, 1959 |
| 2,889,183 | Peras | June 2, 1959 |
| 2,906,377 | Peras | Sept. 29, 1959 |